United States Patent
Li et al.

(10) Patent No.: US 12,066,718 B2
(45) Date of Patent: Aug. 20, 2024

(54) DISPLAY PANEL AND LIQUID CRYSTAL DISPLAY DEVICE

(71) Applicant: TCL CHINA STAR OPTOELECTRONICS TECHNOLOGY CO., LTD., Shenzhen (CN)

(72) Inventors: Liang Li, Shenzhen (CN); Zui Wang, Shenzhen (CN); Xiaowen Lv, Shenzhen (CN)

( * ) Notice: Subject to any disclaimer, the term of this patent is extended or adjusted under 35 U.S.C. 154(b) by 0 days.

(21) Appl. No.: 17/602,756

(22) PCT Filed: Aug. 10, 2021

(86) PCT No.: PCT/CN2021/111652
§ 371 (c)(1),
(2) Date: Oct. 10, 2021

(87) PCT Pub. No.: WO2023/000405
PCT Pub. Date: Jan. 26, 2023

(65) Prior Publication Data
US 2024/0053639 A1    Feb. 15, 2024

(30) Foreign Application Priority Data
Jul. 23, 2021    (CN) .......................... 202110835740.7

(51) Int. Cl.
*G02F 1/1339*    (2006.01)
*G02F 1/1345*    (2006.01)

(52) U.S. Cl.
CPC ........ *G02F 1/1339* (2013.01); *G02F 1/13458* (2013.01); *G02F 1/13452* (2013.01)

(58) Field of Classification Search
CPC .. G02F 1/1339; G02F 1/1341; G02F 1/13394; G02F 2001/13396; G02F 1/1679;
(Continued)

(56) References Cited

U.S. PATENT DOCUMENTS

| | | | | |
|---|---|---|---|---|
| 2011/0090445 | A1* | 4/2011 | Kim ...................... | G02F 1/1339 349/139 |
| 2011/0134352 | A1* | 6/2011 | Nakagawa ............ | G02F 1/1345 349/43 |
| 2021/0096433 | A1* | 4/2021 | Shim ................. | G02F 1/136227 |

FOREIGN PATENT DOCUMENTS

| | | |
|---|---|---|
| CN | 102043297 A | 5/2011 |
| CN | 203287657 U  * | 11/2013 |

(Continued)

OTHER PUBLICATIONS

Chai, English translation of CN-203287657-U (Year: 2013).*

*Primary Examiner* — Jonathan Y Jung

(57) ABSTRACT

A display panel and a liquid crystal display device are provided. The display panel includes a first substrate and a second substrate, a sealant, a display layer, a circuit layer, and an organic film layer. The organic film layer includes vias and planarization portions arranged adjoining the vias. A first conductive layer includes conductive pads, and each conductive pad covers a signal line in at least one via and the planarization portion adjoining the vias. A second conductive layer is disposed on one side of the second substrate. A conductive ball of the sealant is located on the planarization portions and contact the first conductive layer and the second conductive layer. The signal line is electrically connected to the second conductive layer through the conductive pad and the conductive ball.

14 Claims, 6 Drawing Sheets

(58) Field of Classification Search
CPC . G02F 1/1345; G02F 1/13452; G02F 1/13458
See application file for complete search history.

(56) References Cited

FOREIGN PATENT DOCUMENTS

| | | |
|---|---|---|
| CN | 203287657 U | 11/2013 |
| CN | 105158986 A | 12/2015 |
| CN | 106990593 A | 7/2017 |
| CN | 107153307 A | 9/2017 |
| CN | 109407414 A | 3/2019 |
| CN | 208689319 U | 4/2019 |
| JP | 2004272272 A | 9/2004 |
| KR | 20090117148 A | 11/2009 |

* cited by examiner

DISPLAY PANEL AND LIQUID CRYSTAL DISPLAY DEVICE

FIELD OF INVENTION

The present application relates to a field of display technology and particularly relates to a display panel and a liquid crystal display device.

BACKGROUND OF INVENTION

With advancement of technology, display panels have been widely used in various fields and commonly used in a variety of electronic products, such as mobile phones, portable multimedia devices, notebook computers, televisions, and monitors. Liquid crystal display panels are mainstreaming display products. A current liquid crystal display panel includes a thin-film transistor substrate (array substrate), a color filter substrate (CF substrate), and a liquid crystal material sandwiched between the array substrate and the CF substrate. The array substrate and the CF substrate are opposed to each other and are assembled into a cell by a bonding process with a sealant. Wherein, the thin-film transistor substrate has thin-film transistors and pixel electrodes arranged on a substrate, and data is input to the pixel electrodes by controlling the thin-film transistors to control turning of liquid crystals to display images.

As sizes of liquid crystal displays become larger, utilization rates of large-size panels become higher. In order to increase display area as much as possible under a limited panel area, it is necessary to reduce a wiring arrangement of the array substrate. Use of a sealant to conduct wiring can save the wiring arrangement of a thin-film transistor array substrate and improve the utilization rates of the large-size panels. During a manufacturing process of a liquid crystal display panel, an organic film layer is further covered on the array substrate to improve flatness of a surface of an underlying film layer. However, formation of the organic film layer seriously affects level differences between various positions, especially opening positions of the organic film layer is relatively low, which causes conductive balls in the sealant to be unable to contact the CF substrate and the array substrate. This further causes problems of poor alignment and uneven brightness, and causes the display panel to fail to display normally.

Technical Problem

The present application provides a display panel and a liquid crystal display device to solve the technical problem that the conductive balls in the sealant of the current display panel cannot normally contact the upper and lower substrates, resulting in poor alignment, uneven brightness, poor display quality, and high manufacturing costs.

SUMMARY OF INVENTION

In order to solve the above problems, the technical solutions provided by the present application are as follows:

An embodiment of the present application provides a display panel having a display area and a peripheral area adjacent to the display area. The display panel includes: a first substrate and a second substrate that are opposed to each other; a sealant disposed on the peripheral area and sealing a periphery of the first substrate and a periphery of the second substrate, wherein the sealant includes conductive balls; a display layer disposed between the first substrate and the second substrate; a circuit layer disposed on the first substrate and located within the sealant on the peripheral area, wherein the circuit layer includes signal lines arranged at intervals; an organic film layer disposed on a side of the first substrate adjacent to the sealant, wherein the organic film layer includes vias and planarization portions arranged adjoining the vias, the vias are defined to expose the signal lines, and the planarization portions cover part of the signal lines; a first conductive layer comprising conductive pads, wherein each conductive pad covers the signal lines in at least one of the vias and the planarization portions adjoining the via; and a second conductive layer disposed on a side of the second substrate adjacent to the sealant; wherein the conductive balls are located on the planarization portions and contact the first conductive layer and the second conductive layer, and the signal lines are electrically connected to the second conductive layer through the conductive pads of the first conductive layer and the conductive balls.

Optionally, at least one end of each conductive pad is disposed along a sidewall of one of the planarization portions adjoining the vias to an upper surface of the planarization portion.

Optionally, part of the organic film layer corresponding to one of the conductive pads includes at least two of the vias and one of the planarization portions provided between the at least two vias, and the conductive pad covers the signal lines in the at least two vias and the planarization portion between the at least two vias.

Optionally, the sealant includes sealant strips spaced apart from each other, and each sealant strip is disposed along the conductive pads and covers a corresponding planarization portion of the organic film layer and at least part of the vias adjoining the planarization portion.

Optionally, each via extends to two sides of a corresponding conductive pad, and an area of each via is smaller than an area of the corresponding conductive pad.

Optionally, the vias are spaced apart from each other and alternately defined in a part of the organic film layer corresponding to the conductive pads.

Optionally, the sealant includes at least one hollow portion, and the hollow portion is provided corresponding to at least one of the vias.

Optionally, each conductive pad of the first conductive layer partially covers an upper surface of one of the planarization portions of the organic film layer.

Optionally, the display panel further includes an organic film block disposed on a side of the second substrate adjacent to the sealant and located directly above one of the vias of the organic film layer, wherein the second conductive layer is disposed along an outer surface of the organic film block.

An embodiment of the present application further provides a liquid crystal display device, including a backlight module and a display panel. The backlight module is configured to provide the light source required by the display panel. The display panel includes: a first substrate and a second substrate arranged opposite to each other; a sealant disposed on the peripheral area and sealing a periphery of the first substrate and a periphery of the second substrate, wherein the sealant includes conductive balls; a display layer disposed between the first substrate and the second substrate; a circuit layer disposed on the first substrate and located within the sealant on the peripheral area, wherein the circuit layer includes a plurality of signal lines arranged at intervals; an organic film layer disposed on a side of the first substrate adjacent to the sealant, wherein the organic film layer is defined with vias and includes planarization portions arranged adjoining the vias, the vias are defined to expose the signal lines, and the planarization portions cover part of the signal lines; a first conductive layer including conductive pads, wherein each conductive pad covers the signal lines in at least one of the vias and the planarization portions adjoining the via, and at least one end of each conductive pad is disposed along a sidewall of one of the planarization portions adjoining the vias to an upper surface of the planarization portion; and a second conductive layer disposed on a side of the second substrate adjacent to the sealant; wherein the conductive balls are located on the planarization portions and contact the first conductive layer and the second conductive layer, and the signal lines are electrically connected to the second conductive layer through the conductive pads of the first conductive layer and the conductive balls.

Beneficial Effect

The beneficial effects of this application are:

In the display panel and liquid crystal display device provided by the present application, a plurality of vias and the planarization portion adjoining the plurality of vias are provided in the part of the organic film layer within the sealant corresponding to the single conductive pad, and the conductive pad covers the signal lines in the corresponding vias and the upper surface of the planarization portion, which effectively reduces the distance between the organic film layer and the second conductive layer. In addition, in the part of the organic film layer corresponding to the conductive pad, vias and planarization portions are provided in a local area to prevent wide vias from easily causing conductive balls to fall into the vias. With the structure composed of the vias and the planarization portions of the organic film layer and the conductive pads, the signal line on the first substrate can be electrically connected to the second conductive layer of the second substrate through the conductive pads of the first conductive layer and the conductive balls. This realizes the function of conducting the upper substrate and the lower substrate and further solves the problem that the conductive balls in the sealant of the current display panel cannot effectively contact the second conductive layer to conduct the upper substrate and the lower substrate, which causes problems of poor alignment and uneven brightness, as well as the disadvantages of high manufacturing costs and complicated manufacturing processes.

DESCRIPTION OF DRAWINGS

In order to explain the embodiments or the technical solutions in the prior art more clearly, the following will briefly introduce the drawings that need to be used in the description of the embodiments or the prior art. Obviously, the drawings in the description are only some embodiments of the invention. For those of ordinary skill in the art, other drawings can be obtained based on these drawings without doing creative work.

DETAILED DESCRIPTION OF PREFERRED EMBODIMENTS

Figure 1:
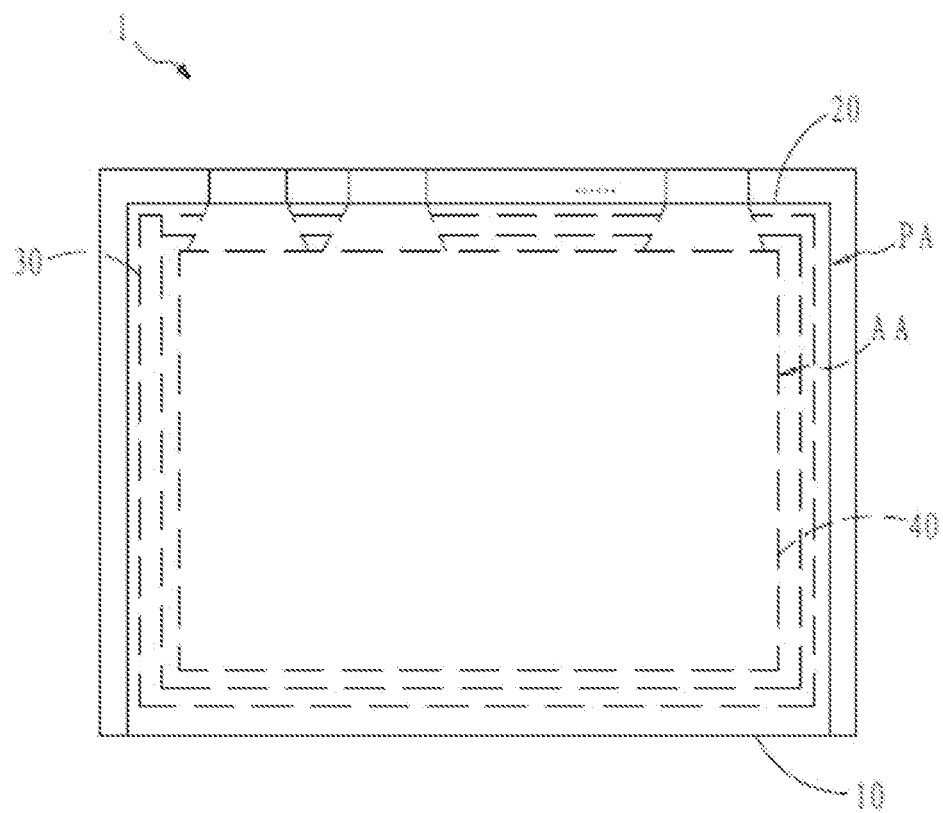
FIG. 1 is a schematic diagram of a planar structure of a display panel provided by an embodiment of the application.

The description of the following embodiments refers to the attached drawings to illustrate specific embodiments in the present application. The directional terms mentioned in the present invention, such as "above", "below", "front", "back", "left", "right", "inside", "outside", "side", etc., are only directions for referring to the attached drawings. Therefore, the directional terms are used to describe and understand the present invention, rather than limit the present invention. In the figure, units with similar structures are denoted by the same reference numerals. In the figures, for clear understanding and ease of description, the thickness of some layers and regions are exaggerated. That is, the size and thickness of each component shown in the figures are arbitrarily shown, but the present application is not limited thereto.

The present application provides a display panel, especially a liquid crystal display panel that uses a sealant to conduct circuits, which is configured to improve the problem that the conductive balls cannot effectively contact the color film substrate and the array substrate after the sealant is applied.

Please refer to FIG. 1 of the present application. FIG. 1 is a schematic diagram of a planar structure of a display panel provided by an embodiment of the present application. As shown in FIG. 1, the display panel 1 of the present application is defined with a display area AA (active area) and a peripheral area PA (peripheral area) adjacent to the display area AA. It also includes a first substrate 10, a second substrate 20 disposed opposite to the first substrate 10, a sealant 30 disposed in the peripheral area PA, and a display layer 40 disposed between the first substrate 10 and the second substrate 20. The first substrate 10 and the second substrate 20 can be glass substrates, quartz substrates, or plastic substrates, which are tot limited herein. The display layer 40 of this embodiment is a liquid crystal layer and has a plurality of liquid crystal molecules (not shown). In addition, the display area AA of the display panel 1 is an area where light can pass through to display an image, and the peripheral area PA is mainly an area where driving elements and wiring are arranged. Because of the black matrix pattern, light is difficult to penetrate. The embodiment of the present application takes the peripheral area PA surrounding the display area AA as an example for description.

It should be noted that although the display panel in this embodiment of the present application uses a liquid crystal display panel as an example, in another embodiment, the display panel can also be an organic light-emitting diode display panel (not shown), and the display layer can be an organic light-emitting layer. Also, the second substrate can be a protective cover plate to protect the organic light-emitting layer from external moisture or foreign matter.

Figure 2:
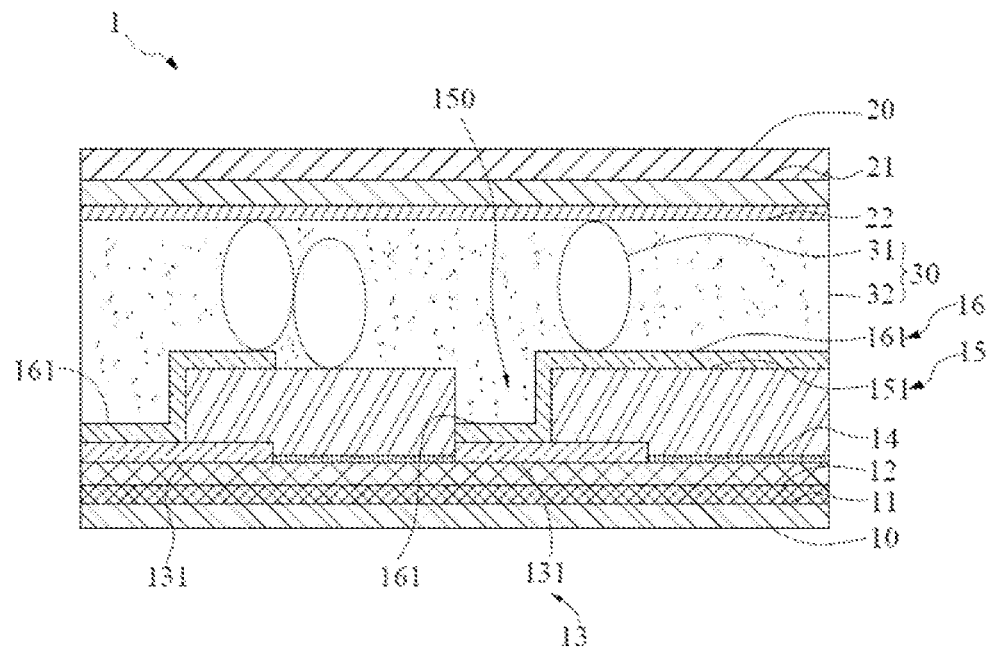
FIG. 2 is a schematic diagram of a cross-sectional structure of a corresponding part of a peripheral area of the display panel in FIG. 1.
Figure 3:
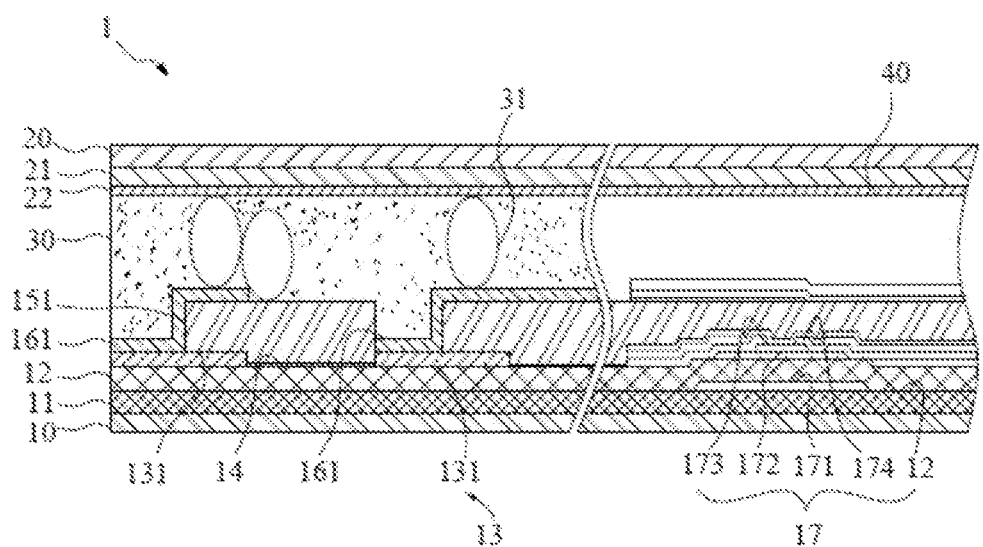
FIG. 3 is a schematic cross-sectional structure diagram of the display panel in FIG. 1.

Please refer to FIG. 2 and FIG. 3. FIG. 2 is a schematic diagram of a cross-sectional structure of a corresponding part of a peripheral area of the display panel in FIG. 1. FIG. 3 is a schematic cross-sectional structure diagram of the display panel 1 in FIG. 1. As shown in FIG. 2, the sealant 30 of the present application is arranged in the peripheral area PA and seals the peripheries of the first substrate 10 and the second substrate 20, so that the display layer 40 is sealed between the first substrate 10 and the second substrate 20 (as shown in FIG. 3). It is noted that the sealant 30 of the embodiment of the present application preferably adopts electrically conductive adhesives with conductive properties. As shown in FIG. 2, the sealant 30 is composed of conductive balls 31 and adhesive 32, wherein the conductive balls 31 are distributed in the adhesive 32. Specifically, the conductive ball 31 can be made of gold, silver, copper, or aluminum, or a sphere plated with gold, silver, copper, or aluminum. Optionally, the conductive ball 31 may also include two or more of the aforesaid spheres. The conductive ball 31 used in the embodiment of the present application is a gold ball.

As shown in FIG. 2, the first substrate 10 in the embodiment of the present application is provided with a gate layer 11, a gate insulating layer 12, a circuit layer 13, a passivation layer 14, an organic film layer 15, and a first conductive layer 16 from bottom to top. As shown in FIG. 3, the first substrate 10 in the embodiment of the present application further includes thin-film transistors 17 arranged in an array, a functional film layer (not numbered), and a display layer 40 in a portion corresponding to the display area AA. The thin-film transistor 17 conducts the active layer 172 and the source 173 and the drain 174 according to the scan signal, and inputs data to the pixel electrode (not shown) according to the data signal, thereby controlling the rotation of the liquid crystal in the display layer 40 to display image. It is noted that gate layer 11 in the embodiment of the present application can be defined as a first metal layer, and circuit layer 13 can be defined as a second metal layer. Through the configuration of the first metal layer, the second metal layer, the gate insulating layer, and the active layer, an array gate driver circuit on array area (i.e., gate driver on array, GOA) can be formed, where the gate driver circuit is directly formed on the first substrate 10. However, the gate driver circuit of the present application is not limited to this. The application of GOA circuit can effectively reduce the weight of the display panel, reduce the process, reduce the cost, and increase the reliability of the display. Because the GOA circuit is adopted, the driving components required by the display panel 1 in the embodiment of the present application, such as driving ICs, are mainly arranged in the peripheral area PA on the upper or lower side of the display panel 1, which achieves the effect of narrowing the display panel.

Please refer to FIG. 2. The second substrate 20 in the embodiment of the present application is sequentially provided with a black light-shielding layer 21 and a second conductive layer 22 in a direction toward the first substrate on a portion corresponding to the peripheral area PA, wherein the black light-shielding layer 21 (i.e., a black matrix layer) plays the role of shielding light, and the second conductive layer 22 extends to a portion of the second substrate 20 corresponding to the display area AA. In addition, the portion of the second substrate 20 corresponding to the display area AA further includes a color filter layer (not shown) located between the second conductive layer 22 and the second substrate 20. The materials of the first conductive layer 16 and the second conductive layer 22 in the embodiment of the present application are indium tin oxide (ITO), but they can also be conductive materials such as indium zinc oxide (IZO), aluminum zinc oxide (AZO), cadmium tin oxide (CTO), tin oxide ($SnO_2$), or zinc oxide (ZnO), which are not limited. As shown in FIG. 2, the sealant 30 is disposed between the first conductive layer 16 and the second conductive layer 22 and is attached to the first conductive layer 16 and the second conductive layer 22.

It is noted that the second conductive layer 22 in the embodiment of the present application can be an anisotropic conductive film, and the second conductive layer 22 is patterned by a laser patterning process. The laser patterning process uses a laser to directly heat the part of the conductive layer that it irradiates, and controls the position of the laser irradiation to leave the patterned conductive film to be formed. Therefore, the laser patterning process used in the embodiment of the present application can not only improve the accuracy of the etching and reduce the processing time but also save the array wiring and reduce the cost of the fixture.

As shown in FIG. 2, the circuit layer 13 in the embodiment of the present application includes a plurality of signal lines 131 arranged at intervals for signal transmission. Specifically, the circuit layer 13 forms signal lines 131 after patterning and photolithography processes, and forms vias between the patterned signal lines 131, so that the passivation layer 14 can be formed in the vias between the signal lines 131 to achieve a flattening effect so that the subsequent organic film layer 15 can be formed on a flat surface.

As shown in FIG. 2, the circuit layer 13 in the embodiment of the present application includes a plurality of signal lines 131 arranged at intervals for signal transmission. Specifically, the circuit layer 13 forms signal lines 131 after patterning and photolithography processes, and forms vias between the patterned signal lines 131, so that the passivation layer 14 can be formed in the vias between the signal lines 131 to achieve a flattening effect so that the subsequent organic film layer 15 can be formed on a flat surface. In addition, in the embodiment of the present application, an organic film layer 15 is further coated on the passivation layer 14. The material of the organic film layer 15 can be, for example, polyfluoroalkoxy (PFA). The organic film layer 15 can further improve the flatness of the surface of the underlying film, achieve a flattening effect, and prevent electric fields from interfering with each other. In another embodiment, the passivation layer can also be replaced by a PFA film layer alone. As shown in FIG. 2, the organic film layer 15 of the present application covers the side of the first substrate 10 adjacent to the sealant 30. The organic film layer 15 includes a plurality of vias 150 and a planarization portion 151 arranged adjoining the plurality of vias 150. Specifically, in the actual process, the organic film layer 15 is first coated on the passivation layer 14 and the circuit layer 13. After that, the plurality of vias 150 are formed through a photolithography process including exposure, development, and etching for exposing the signal lines 131 of the circuit layer 13. After the vias 150 of the organic film layer 15 are formed, the first conductive layer 16 is finally formed so that the first conductive layer 16 completely covers the signal lines 131 in each via 150 and the planarization portions 15 adjoining the vias 150. At this time, all the film structures on the first substrate 10 corresponding to the sealant 30 are completed. In the embodiments of the present application, the arrangement of the organic film layer 15 further improves the flatness of the film layer and further protects the underlying film layer structure.

As described above, the conductive balls 31 between the first conductive layer 16 and the second conductive layer 22 are dispersed in the adhesive 32. Specifically, the conductive balls 31 are scattered on the planarization portion 151. However, because the arrangement of the organic film layer 15 causes a height difference between the first conductive layer 16 and the organic film layer 15, part of the conductive balls 31 may fall in the low-level via 150 and cannot contact the second conductive layer 22. In other words, the height difference causes the conductive ball 31 to be unable to contact the upper substrate, and unable to conduct the second conductive layer 22 (i.e., color filter substrate or the upper substrate) and the first conductive layer 16 (i.e., array substrate or the lower substrate), thereby causing the problem of poor alignment. To solve the above problems, in some embodiments of the present application, the first conductive layer 16 extends from the signal line 131 to the upper surface of the organic film layer 15, so that the distance from the upper surface of the first conductive layer 16 to the lower surface of the second conductive layer 22 on the planarization portion 151 is less than the distance from the upper surface of the planarization portion 151 to the lower surface of the second conductive layer 22, which effectively reduces the distance between the organic film layer 15 and the second conductive layer 22. Furthermore, the signal line 131 can be electrically connected to the second conductive layer 22 through the first conductive layer 16 and the conductive balls 31 to achieve a conductive effect.

Figure 4:
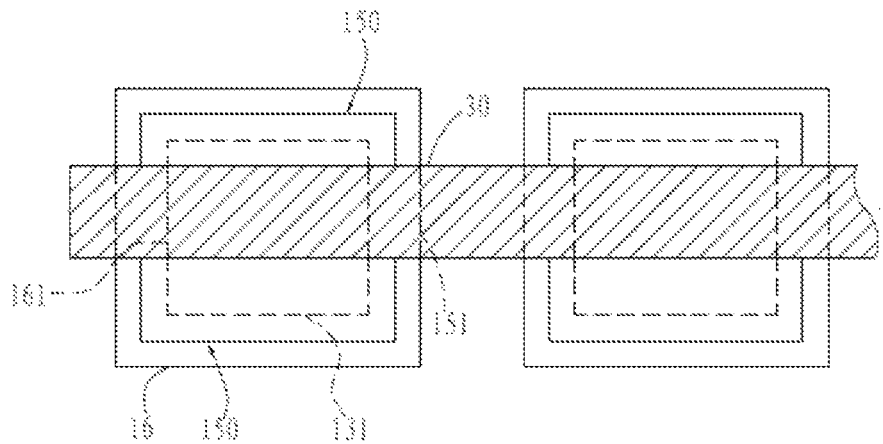
FIG. 4 is a schematic diagram of a planar structure of a corresponding part of the peripheral area of the display panel in FIG. 1.
Figure 5:
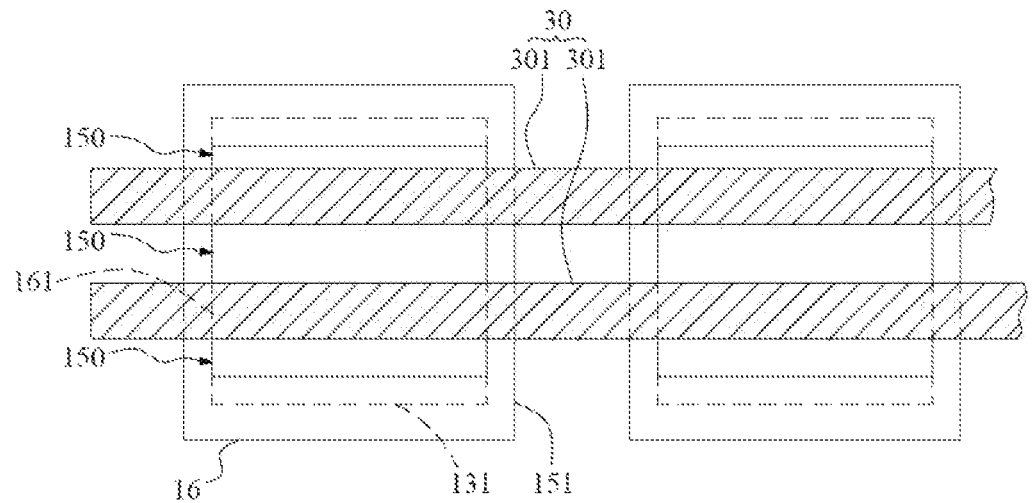
FIG. 5 is a schematic diagram of another planar structure of a corresponding part of the peripheral area of the display panel in FIG. 1.
Figure 6:
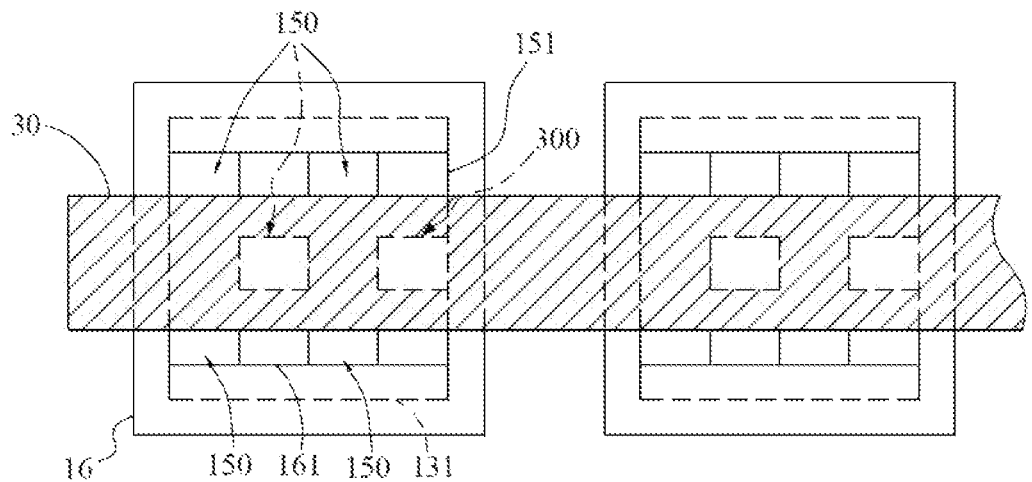
FIG. 6 is a schematic diagram of another planar structure of the corresponding part of the peripheral area of the display panel in FIG. 1.

Please refer to FIG. 4, FIG. 5, and FIG. 6, which are schematic plan views of corresponding parts of the peripheral area PA of the display panel 1 in the embodiment of the present application. The embodiment of the present application provides different structural configurations of the first conductive layer 16 and the organic film layer 15 to achieve the purpose of conducting the upper substrate and the lower substrate through the sealant. Please refer to FIG. 4 together with FIG. 2. The first conductive layer 16 may include a plurality of conductive pads 161, each of the conductive pads 161 completely covers the signal line 131 in the corresponding via 150, and at least one end of the conductive pad 161 is arranged along the sidewall of the adjacent planarization portion 151 to the upper surface of the planarization portion 151. The signal line 131 in each via 150 can be used to transmit different signals, and the plurality of conductive pads 161 are electrically connected by the sealant 30 located above (as shown in FIG. 4). It is particularly noted that, in order to avoid the situation that the conductive balls 31 fall into the via located in the recess position and cannot contact the second conductive layer 22, the embodiment of the present application only forms a plurality of vias 150 in the portion of the organic film layer 15 corresponding to the signal line 131. That is, the planarization portion 151 of the organic film layer 15 further extends and covers part of the upper surface of the signal line 131. The planarization portion 151 covering part of the signal line 131 can also ensure that there is no gap between the organic film layer 15 and the circuit layer 13 adjacent to each other, which will affect the arrangement of the conductive pad 161. Further, the planarization portion 151 adjoining the via 150 extends and covers part of the signal line 131 or the planarization portion 151 between the two vias 150 covers part of the signal line 131, which means that the single conductive pad 161 covers at least one via 150 and at least one flat portion 151. Alternatively, a single conductive pad 161 covers a plurality of vias 150 and the planarization portion 151 located between the vias 150.

Figure 4A:
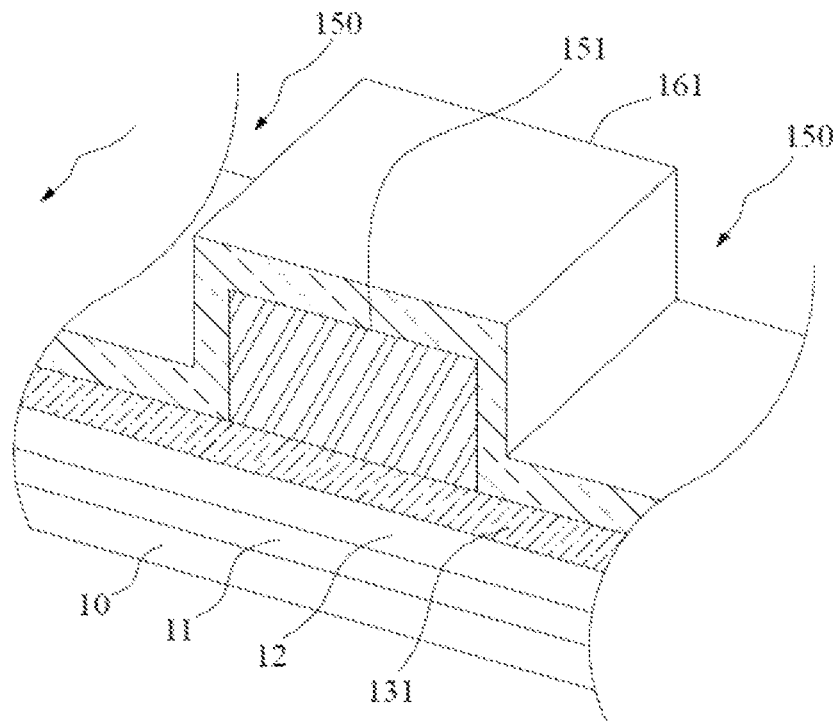
FIG. 4A is a partial three-dimensional structure diagram of a corresponding part of the peripheral area in FIG. 4.

Please continue to refer to FIG. 4 and FIG. 4A. FIG. 4A is a partial three-dimensional structure diagram of the corresponding part of the peripheral area PA in FIG. 4, but FIG. 4A does not show the sealant 30. As shown in FIG. 4 and FIG. 4A, the organic film layer 15 is defined with two vias 150 spaced apart from each other at the position corresponding to the signal line 131. The signal line 131 exposed by each via 150 is completely covered with a conductive pad 161, and the upper surface and sidewalls of the planarization portion 15 adjoining the via 150 are provided with a conductive pad 161 (as shown in FIG. 4A). The conductive pad 161 may partially cover the upper surface of the planarization portion 151 or completely cover the upper surface of the planarization portion 151. It is particularly noted that the conductive pad 161 must be provided extending from the upper surface of the signal line 131 along the sidewall of the planarization portion 151 to the upper surface of the planarization portion 151 to form a whole body and facilitate signal transmission. As shown in FIG. 4 and FIG. 4A, a plurality of vias 150 are provided corresponding to a conductive pad 161. Each via 150 extends to two sides of the conductive pad 161, and the area of each via 150 is smaller than the area of the corresponding conductive pad 161. That is, the signal line 131 is provided with the planarization portion 151 of the organic film layer 15 and the conductive pad 161 at other parts except the position corresponding to the via 150. In addition, in the embodiment of FIG. 4, the sealant 30 may not completely cover the entire conductive pad 161, the sealant 30 may not completely cover the entire conductive pad 161 but is mainly arranged in the area corresponding to the planarization portion 151, and at least covers one side of the planarization portion 151 adjoining the via 150, so as to achieve the effect of reducing materials and reducing costs. Accordingly, the signal line 131 can be electrically connected to the second conductive layer 22 through the first conductive layer 16 and the conductive balls 31 to achieve a conductive effect.

Figure 5A:
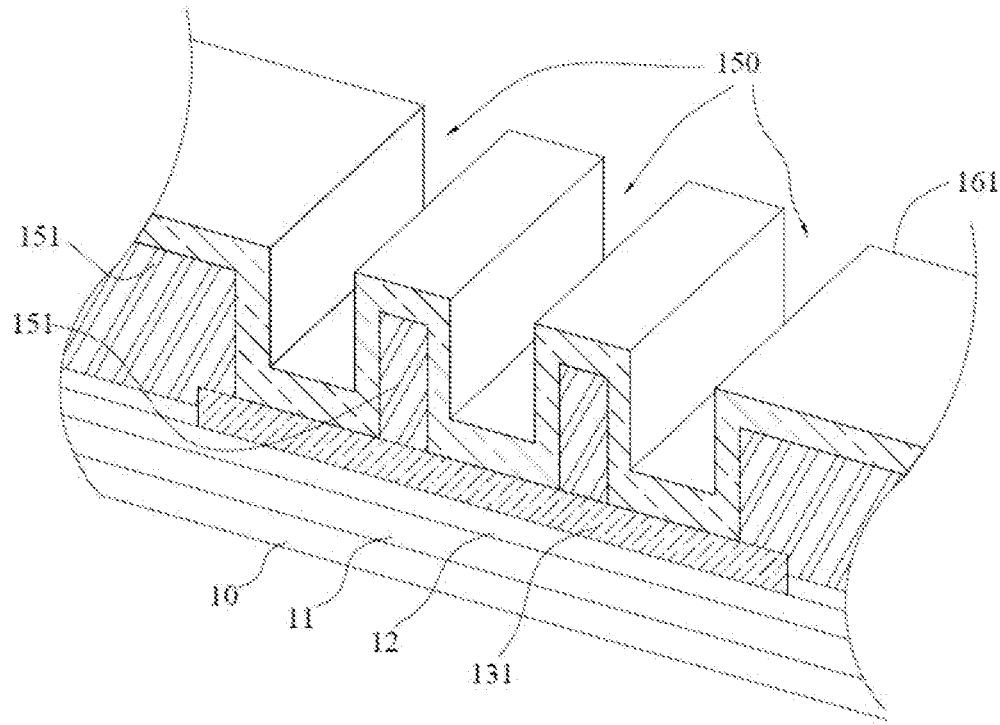
FIG. 5A is a partial three-dimensional structure diagram of the corresponding part of the peripheral area in FIG. 5.

Please refer to FIG. 5 and FIG. 5A. FIG. 5A is a partial three-dimensional structure diagram of the corresponding part of the peripheral area in FIG. 5, but the sealant 30 is not shown in FIG. 5A. The difference between this embodiment and the embodiment shown in FIG. 4 is that in the same range as the conductive pad in the embodiment shown in FIG. 4, the organic film layer in FIG. 5 is defined with three vias spaced apart from each other at the position corresponding to the signal line. Specifically, the signal line 131 exposed by the vias 150 is completely covered with the conductive pad 161, and the upper surface and sidewalls of the planarization portion 151 adjoining the vias 150 are provided with the conductive pad 161 (as shown in FIG. 5A). In order to further reduce the amount of sealant 30 used, in the embodiment of FIG. 5, the sealant 30 includes a plurality of sealant strips 301 spaced apart from each other. Each sealant strip 301 is disposed along the corresponding conductive pad 161 and covers the planarization portion 151 of the organic film layer 15 and part of the via 150 adjoining the planarization portion 151. As shown in FIG. 5A, the conductive pad 161 is disposed along the signal line 131 and the sidewall of the vias 150 and the upper surface of the planarization portion 151. Therefore, the structural configuration of the conductive pad 161 and the organic film layer 15 in the embodiment shown in FIG. 5 can achieve the same effect as the embodiment shown in FIG. 4. In addition, because the number of vias 150 is increased, it can provide better material saving effect and cost reduction.

Please refer to FIG. 6, which is a schematic diagram of another planar structure of the corresponding part of the peripheral area of the display panel in FIG. 1. The difference between the embodiment shown in FIG. 6 and the embodiment shown in FIG. 4 is that the plurality of vias 150 of the organic film layer 15 are spaced apart from each other and alternately arranged on the corresponding conductive pads 161, wherein the area of each via 150 is smaller than the area of the corresponding conductive pad 161. As shown in FIG. 6, in this embodiment, the signal line 131 exposed by each via 150 is completely covered with a conductive pad 161, and the upper surface and sidewalls of the planarization portion 151 adjoining the via 150 are provided with conductive pads 161. It is particularly noted that in the embodiment of FIG. 6, the sealant 30 is provided according to the arrangement of the corresponding vias 150 below. Specifically, the sealant 30 of FIG. 6 includes a plurality of hollow portions 300, and the hollow portions 300 are provided corresponding to the vias 150 below, that is, the hollow portions 300 of the sealant 30 are not filled with adhesive. Accordingly, the signal line 131 in the via 150 can also be connected to the second conductive layer 22 above it by the conductive ball 31 through the configuration of the conductive pad 161 to achieve the same effect as the embodiment shown in FIG. 4. In addition, because the number of vias 150 is increased, it can provide better material saving and cost reduction effects.

Figure 7:
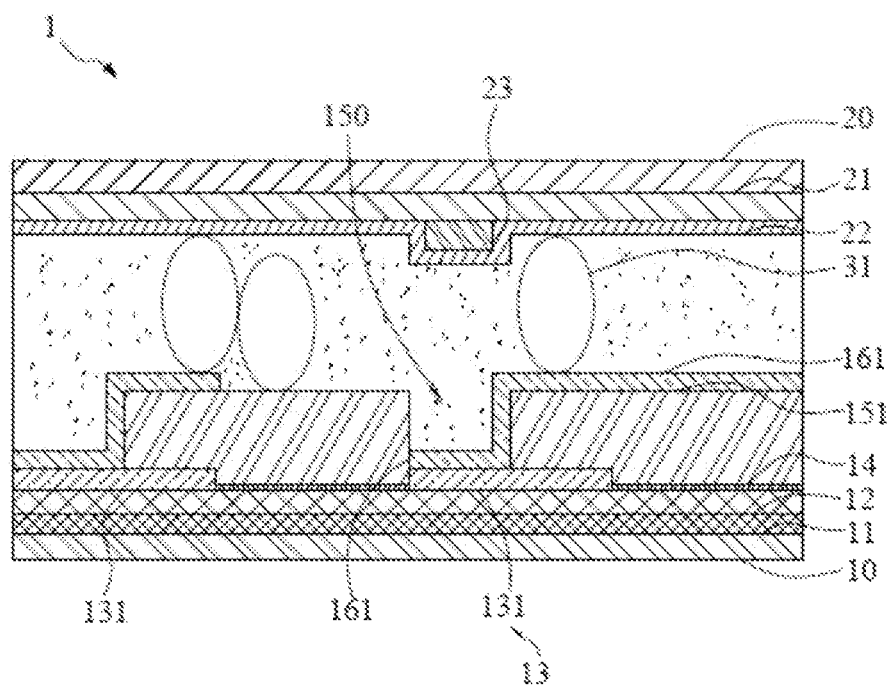
FIG. 7 is a schematic diagram of another cross-sectional structure of the corresponding part of the peripheral area of the display panel in FIG. 1.

In addition, in order to ensure that the conductive balls in the sealant can conduct the upper substrate and the lower substrate, an organic film layer can be further provided on the second conductive layer of the upper substrate. Please refer to FIG. 7, which is a schematic diagram of another cross-sectional structure of the corresponding part of the peripheral area of the display panel in FIG. 1. As shown in FIG. 7, the display panel 1 of the embodiment of the present application further includes an organic film block 23, wherein the organic film block 23 is disposed on the side of the second substrate 20 adjacent to the sealant 30. Specifically, organic film block 23 is located directly above the via 150 of the organic film layer 15 of the first substrate 10 below, and the second conductive layer 22 is disposed along the outer surface of the organic film block 23. By arranging the organic film block 23, the distance from the via 150 of the organic film layer 15 of the first substrate 10 to the second conductive layer 22 above it can be reduced so that the stack of conductive balls 31 can easily contact the second conductive layer 22 to achieve the effect of conducting the upper substrate and the lower substrate.

Figure 8:
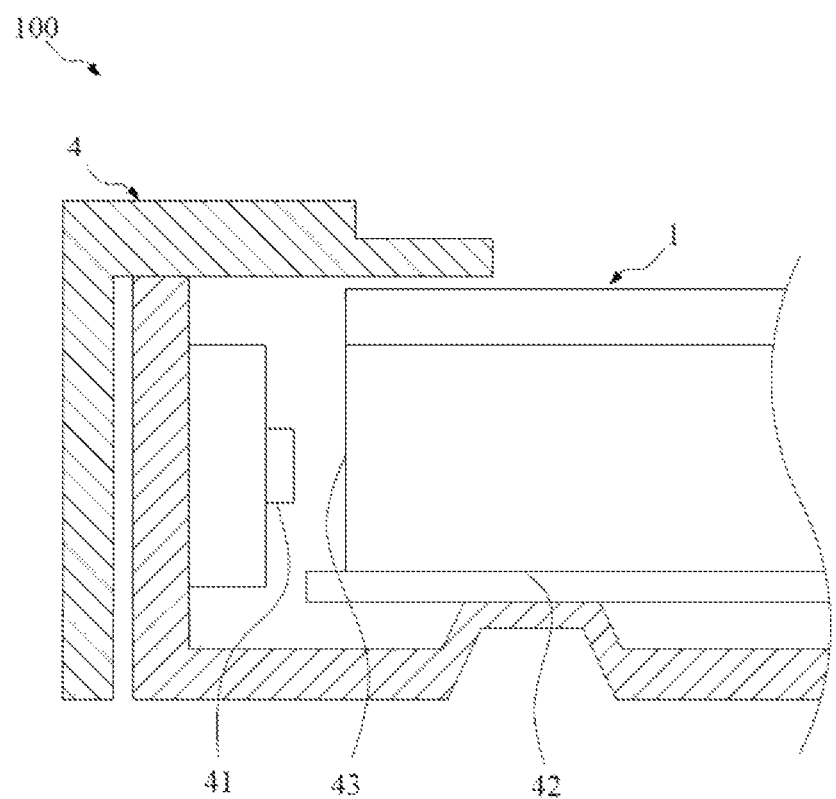
FIG. 8 is a schematic cross-sectional structure diagram of a liquid crystal display device provided by an embodiment of the present application.

Please refer to FIG. 8. FIG. 8 is a schematic cross-sectional structure diagram of a liquid crystal display device 100 according to an embodiment of the application. As shown in FIG. 8, there is another liquid crystal display device 100 according to an embodiment of the present application. The liquid crystal display device 100 includes a backlight module 4 and the display panel 1 described in the foregoing embodiment. The backlight module 4 cited in this embodiment of the present application is a side-in backlight module, which is used to provide the light source required by the display panel 1. The backlight module 4 includes optical elements such as light-emitting elements 41, reflective sheets 42, and diffusers 43. The detailed structure of the backlight module 4 can be the same as the structure of the backlight module of the current liquid crystal display device, and will not be described herein.

As mentioned above, in the display panel and liquid crystal display device provided by the present application, a plurality of vias and the planarization portion adjoining the plurality of vias are provided in the part of the organic film layer within the sealant corresponding to the single conductive pad, and the conductive pad covers the signal lines in the corresponding vias and the upper surface of the planarization portion, which effectively reduces the distance between the organic film layer and the second conductive layer. In addition, in the part of the organic film layer corresponding to the conductive pad, vias and planarization portions are provided in a local area to prevent wide vias from easily causing conductive balls to fall into the vias. With the structure composed of the vias and the planarization portions of the organic film layer and the conductive pads, the signal line on the first substrate can be electrically connected to the second conductive layer of the second substrate through the conductive pads of the first conductive layer and the conductive balls. This realizes the function of conducting the upper substrate and the lower substrate and further solves the problem that the conductive balls in the sealant of the current display panel cannot effectively contact the second conductive layer to conduct the upper substrate and the lower substrate, which causes problems of poor alignment and uneven brightness, as well as the disadvantages of high manufacturing costs and complicated manufacturing processes.

In the aforesaid embodiments, the description of each embodiment has its own emphasis. For parts that are not described in detail in an embodiment, reference may be made to related descriptions of other embodiments.

The embodiments of the present application are described in detail above, and specific examples are used in this article to illustrate the principles and implementation of the present application. The descriptions of the aforesaid embodiments are only used to help understand the technical solutions and core ideas of the present application. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present application.

What is claimed is:

1. A display panel having a display area and a peripheral area adjacent to the display area, and comprising:
    a first substrate and a second substrate arranged opposite to each other;
    a sealant disposed on the peripheral area and sealing a periphery of the first substrate and a periphery of the second substrate, wherein the sealant comprises conductive balls;
    a display layer disposed between the first substrate and the second substrate;
    a circuit layer disposed on the first substrate and located within the sealant on the peripheral area, wherein the circuit layer comprises signal lines arranged at intervals;
    an organic film layer disposed on a side of the first substrate adjacent to the sealant, wherein the organic film layer is defined with vias and comprises planarization portions arranged adjoining the vias, the vias are defined to expose the signal lines, and the planarization portions cover part of the signal lines;
    a first conductive layer comprising conductive pads, wherein each conductive pad covers the signal lines in at least one of the vias and the planarization portions adjoining the via; and a second conductive layer disposed on a side of the second substrate adjacent to the sealant;

wherein the conductive balls are located on the planarization portions and contact the first conductive layer and the second conductive layer, and the signal lines are electrically connected to the second conductive layer through the conductive pads of the first conductive layer and the conductive balls, wherein a portion of the organic film layer corresponding to one of the conductive pads comprises at least two of the vias and one of the planarization portions provided between the at least two vias, and the conductive pad covers the signal lines in the at least two vias and the planarization portion between the at least two vias.

2. The display panel of claim 1, wherein at least one end of each conductive pad is disposed along a sidewall of one of the planarization portions adjoining the vias to an upper surface of the planarization portion.

3. The display panel of claim 1, wherein the sealant comprises sealant strips spaced apart from each other, and each sealant strip is disposed along the conductive pads and covers a corresponding planarization portion of the organic film layer and at least part of the vias.

4. The display panel of claim 1, wherein each via extends to two sides of a corresponding conductive pad, and an area of each via is smaller than an area of the corresponding conductive pad.

5. The display panel of claim 1, wherein the vias are spaced apart from each other and alternately defined in a part of the organic film layer corresponding to the conductive pads.

6. The display panel of claim 5, wherein the sealant comprises at least one hollow portion, and the hollow portion is provided corresponding to at least one of the vias.

7. The display panel of claim 1, wherein each conductive pad of the first conductive layer partially covers an upper surface of one of the planarization portions of the organic film layer.

8. The display panel of claim 1, further comprising an organic film block disposed on a side of the second substrate adjacent to the sealant and located directly above one of the vias of the organic film layer, wherein the second conductive layer is disposed along an outer surface of the organic film block.

9. A liquid crystal display device, comprising a backlight module and a display panel, wherein the backlight module is configured to provide light source required by the display panel, and the display panel comprises:
 a first substrate and a second substrate arranged opposite to each other;
 a sealant disposed on the peripheral area and sealing a periphery of the first substrate and a periphery of the second substrate, wherein the sealant comprises conductive balls;
 a display layer disposed between the first substrate and the second substrate;
 a circuit layer disposed on the first substrate and located within the sealant on the peripheral area, wherein the circuit layer comprises a plurality of signal lines arranged at intervals;
 an organic film layer disposed on a side of the first substrate adjacent to the sealant, wherein the organic film layer is defined with vias and comprises planarization portions arranged adjoining the vias, the vias are defined to expose the signal lines, and the planarization portions cover part of the signal lines;
 a first conductive layer comprising conductive pads, wherein each conductive pad covers the signal lines in at least one of the vias and the planarization portions adjoining the via, and at least one end of each conductive pad is disposed along a sidewall of one of the planarization portions adjoining the vias to an upper surface of the planarization portion; and a second conductive layer disposed on a side of the second substrate adjacent to the sealant;
 wherein the conductive balls are located on the planarization portions and contact the first conductive layer and the second conductive layer, and the signal lines are electrically connected to the second conductive layer through the conductive pads of the first conductive layer and the conductive balls,
 wherein a portion of the organic film layer corresponding to one of the conductive pads comprises at least two of the vias and one of the planarization portions provided between the at least two vias, and the conductive pad covers the signal lines in the at least two vias and the planarization portion between the at least two vias.

10. The liquid crystal display device of claim 9, wherein the sealant comprises sealant strips spaced apart from each other, and each sealant strip is disposed along the conductive pads and covers a corresponding planarization portion of the organic film layer and at least part of the vias.

11. The liquid crystal display device of claim 9, wherein each via extends to two sides of a corresponding conductive pad, and an area of each via is smaller than an area of the corresponding conductive pad.

12. The liquid crystal display device of claim 9, wherein the vias are spaced apart from each other and alternately defined in a part of the organic film layer corresponding to the conductive pads.

13. The liquid crystal display device of claim 12, wherein the sealant comprises at least one hollow portion, and the hollow portion is provided corresponding to at least one of the vias.

14. The liquid crystal display device of claim 9, further comprising an organic film block disposed on a side of the second substrate adjacent to the sealant and located directly above one of the vias of the organic film layer, wherein the second conductive layer is disposed along an outer surface of the organic film block.

* * * * *